Patented Sept. 6, 1949

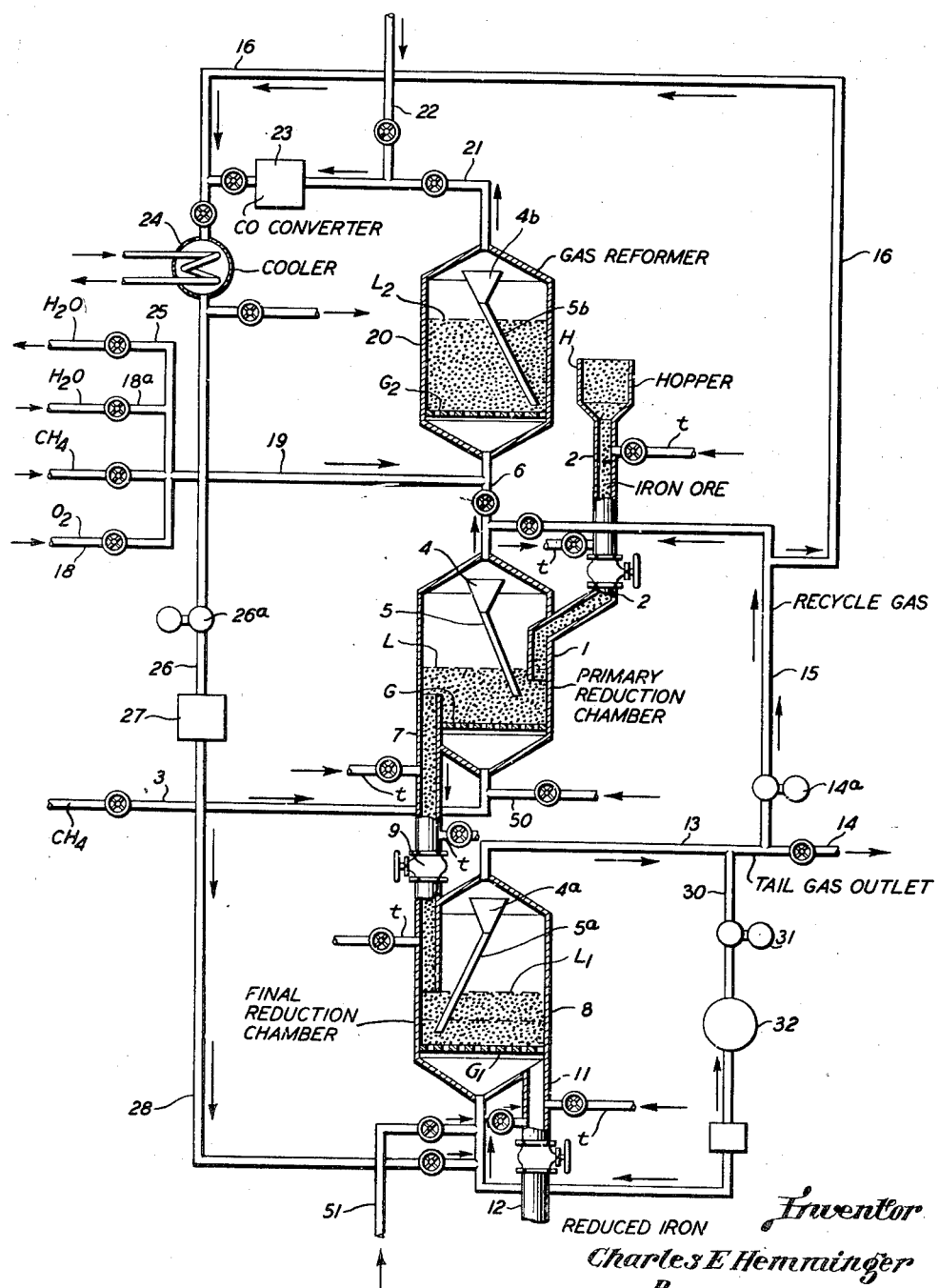

2,481,217

UNITED STATES PATENT OFFICE 2,481,217

PROCESS FOR A TWO-STAGE GASEOUS REDUCTION OF IRON ORE

Charles E. Hemminger, Westfield, N. J., assignor to Standard Oil Development Company, a corporation of Delaware Application June 3, 1947, Serial No. 752,019

2 Claims. (Cl. 75—26)

My present invention relates to improvements in reducing an ore such as iron ore and, in particular, it relates to a process of reducing iron ore in the presence of a normally gaseous hydrocarbon such as ethane, natural gas, or methane and a hydrogen-containing gas in a multi-stage process.

It is generally known, of course, that by and large, that iron is produced commercially from iron ore by reduction in blast furnaces. The process involves the formation of carbon monoxide, which is used to reduce the iron ore. The carbon monoxide is formed by burning coke in air in the blast furnace.

Insofar as I am aware, while others have previously proposed to reduce the ores of iron employing methane alone, or a gas containing a large proportion of methane such as, for instance, natural gas, I have found that improved results are obtainable by reducing iron ores in a plurality of steps employing methane or natural gas in the first step and a hydrogen-containing gas in a following step or steps, all of which will more fully appear hereinafter.

In brief, my present invention embodies means for reducing iron ore in the presence of a normally gaseous hydrocarbon such as methane or a methane-containing gas, merely to the stage where the oxide of iron is in the ferrous state and then subsequently causing further reduction of the iron oxide ore to metallic iron, in a stage or stages employing a gas rich in hydrogen, both or all of which stages are performed employing the so-called "fluid solids" technique. One of the principal reasons why I employ the multi-stage process hereinbefore indicated is that if, for example, the trivalent oxide of iron, which is represented by the formula $Fe_2O_3$, is completely reduced to metallic iron in the presence of methane or natural gas at the temperatures required for this reduction, carbon is formed and deposited on the reduced iron and, furthermore, the reduced iron sinters at the high temperatures employed, that is to say, it either melts or is in a state of incipient fushion. This latter state causes coalescence of the particles, making it impossible to maintain powdered iron in a fluidized state.

One object of my present invention, therefore, is to effect the reduction of an iron ore by a process which is cheaper and more efficient than any heretofore proposed or used.

Another object of my invention is to effect the reduction of an iron ore to metallic iron employing a fuel which is cheaper than the conventional metallurgical coke now employed.

Another object of my invention is to produce iron in a powdered form especially adapted for working into shaped bodies by well known powdered metallurgical processes.

Another object of my invention is to produce metallic iron which iron is of low carbon and/or sulfur content and particularly adapted to be fed to open hearth, Bessemer and electrical furnaces.

Other and further objects of my invention will appear from the following description and claims.

The accompanying drawing shows diagrammatically a preferred modification of my invention.

Referring in detail to the drawing, I represents a primary reducer into which the iron ore in powdered form is charged through a feed conduit 2, which is in the form of a standpipe sufficiently high that a pressure up to 100 pounds per square inch or higher may result in reducer I, the ore charged having an average particle size of from 10 to 300 mesh. This standpipe is in communication with feed hopper H and has a length of about 75 to 125 feet. It is also provided at spaced points with gas taps $t$ through which slow currents of a gas such as methane, hydrogen, etc., may be injected in order to improve the fluidity of the iron flowing downwardly in the said standpipe. Methane or the like enters the system through line 3 and is discharged into the bottom of reducer I, passes through a foraminous member G and is then permitted to flow upwardly at a superficial velocity [1] of from, say, 0.5 to 2.0 feet per second, thus forming within reactor or reducer I a dense, turbulent, ebullient mass of powdered iron ore admixed with or suspended in the upflowing gasiform material. Depending upon the velocity of the gas and the actual amount of iron ore present in the reactor, the dense fluidized mass of powdered iron ore will have an upper dense phase level at

[1] Superficial velocity is that velocity, calculated at temperature and pressure conditions of the reducer, as though no solids were present.

L, above which there will be a dilute phase suspension extending from L to the top of the reactor. In the space from L to the top of the reactor powdered iron or iron ore tends to settle by gravity toward the dense phase existing between G and L, so as to retain within the reactor or reducer the main bulk of the powdered solids. However, in order to remove fines from the gas issuing from the reducer as completely as may be, I provide one or more gas-solids separating devices 4 such as those commonly called "cyclones" wherein entrained fines are separated by centrifugal force and returned by one or more dip pipes 5 to the dense suspension.

The finer the particle size of the ore in reducer 1 the greater the rate of reduction and, hence, the particle size should be small enough to provide maximum surface and yet large enough so as to remain within the reactor. In other words, if the iron or iron ore has a particle size distribution such that 50% of the same is below 20 microns, it is difficult, if not impossible to "fluidize" the solids, to form a homogeneous fluid bed with a substantially constant upper dense phase level and excessive amounts of fines will appear in the gasiform material leaving the reactor. Also it is difficult to maintain good contact between gasiform substance and solids if the solids have the foregoing amount of fines.

Of course, the foregoing reaction is endothermic and I provide sufficient heat to sustain the reaction by introducing air or oxygen into the reducer through line 50. The amount of air is about 50 per cent of that required to burn completely the hydrocarbon gas fed through line 3 to $CO_2$ and $H_2O$. The heat thus supplied will maintain the desired temperature and heat requirements in reducer 1. An alternate method of adding heat to vessel, is to preheat the iron ore fed to the vessel, by any of various means such as contact with hot combustion gas formed by burning hydrocarbons in air. The iron ore should be preheated from about 400° to 800° F. above the desired temperature in the reducer 1 to control the temperature within reducer 1.

A gasiform material is withdrawn from the reducer 1 through a line 6 and processed in a manner which will be described fully hereinafter.

The reducer 1 is provided with a drawoff pipe 7 in communication with a secondary reducer 8, as shown. Through the standpipe 7 which is controlled by a valve 9, solids pass by natural flow into a second reducer 8 and are therein treated with a gas consisting essentially of hydrogen. The hydrogen-containing gas is introduced into the bottom of reducer 8 through line 28 and then caused to flow upwardly through a grid or other foraminous member G—1 at a superficial velocity of from 0.3 to 1.5 feet per second, thus forming within the reducer 8 a second fluidized bed of powdered solids in gasiform material, which bed extends from the grid G—1 to an upper level L—1. As in the case of standpipe 2, standpipe 7 is of sufficient length so that a pressure of 100 to 150 pounds per square inch is maintained in the reducer 8. In other words, in both converters 1 and 8, it is desirable to operate at super-atmospheric pressure for this results in reducing the size of the said reducers. As in the case of reducer 1, the upper dense phase level L—1 is determined by the superficial velocity of the gases flowing upwardly through the reducer 8 and the actual amount of powdered solids contained in the reducer. In reducer 8 the reduction of iron ore to metallic iron is substantially completed and the iron is withdrawn for product recovery through drawoff pipe 11 controlled by a valve 12 and delivered hot to further processing (as in an electric furnace) or after cooling, to storage. As usual pipes 7 and 11 are provided with gas taps through which a gas may be introduced into these pipes for aiding the flow of solids.

The gasiform material in reducer 8 passes up, eventually, into a disengaging space forming the region between L—1 and the top of the reactor, wherein there are disposed one or more separating devices 4—a, the same or similar to those designated 4 in reducer 1, the function of which separating devices is to separate solid fines from the gasiform material, and to return the same, via one or more dip pipes 5—a to the main body, or the dense phase suspension existing between G—1 and L—1. As in the case of reducer 1, reducer 8 is provided with conduit means 51 through which a hydrocarbon gas and an oxygen-containing gas is discharged into the reducer 8, the burning thus occurring serving to add heat to the said reducer 8. In general, however, since reducer 8 may operate 300° to 500° F. lower than reducer 1 the sensible heat carried by the entering solids in reducer 8 may substantially support the endothermic reaction therein occurring. The effluent gases are withdrawn through line 13 and may be rejected from the system through 14, or pumped by a pump 14—a via line 15 into line 6, or to line 16 ahead of a cooler 24 so that water may be removed before the gas is recycled to reducer 8.

In combination with vessels 1 and 8, I may employ a fluidized gas reformer 20 in which I convert methane or natural gas into a gaseous mixture containing hydrogen and carbon monoxide according to a method which I shall describe presently in detail. In the first place, it is desired to point out that I preferably employ a powdered MiO-MgO catalyst for this reformation. This catalyst is formed into a fluidized mass of powdered material in gasiform material in a manner which is analogous to that previously described in connection with the solids in reducers 1 and 8 or, in other words, I form a dense phase suspension extending from a foraminous member G—2 to an upper dense phase level L—2 by controlling the linear velocity of the gas passing upwardly in reformer 20. The MiO-MgO catalyst should be carefully sized to 40 to 100 micron size for purposes to be discussed later. The gas which is injected into the reformer 20 is a mixture of methane or natural gas with steam, from line 19, and the gas issuing from reducers 1 and 8. As indicated in the drawing, oxygen and $H_2O$ from lines 18 and 18a may be mixed with the methane before being discharged into line 6. If desired or necessary, the gases entering vessel 20 may be preheated by heat exchange with the gases exiting from 20 in means not shown. The superficial velocity of the gas flowing through the reformer 20 should be from 0.5 to 2.0 feet per second. As is generally known, the methane undergoes reforming in the presence of steam and oxygen which are present in the gas entering the reformer through line 6. The result of this reformation is to form a gaseous product containing carbon dioxide, carbon monoxide and hydrogen. The gasiform product exits from the dense suspension and passes into a dilute phase suspension existing between L—2 and the top of the reactor and, as in the case of the reducers, one or more gas-solids separating devices 4—b are disposed in the upper part of the reformer, wherein entrained catalyst fines are separated and returned via one or more dip pipes 5—b to the dense phase suspension. The product gas is withdrawn through a line 21, steam is added via line 22 in amounts 2 to 5 times the mols of CO present and then passed through converter 23 which contains red iron oxide catalyst to convert the CO and steam to $CO_2$ and $H_2$. This gaseous product is then discharged into a cooler 24 and cooled to a temperature sufficiently low to condense the greater portion of the water, which water may be withdrawn through line 25 along with entrained solids, and rejected.

The cooled gases withdrawn from cooler 24 are passed via line 26 thru $CO_2$ scrubber 27 to remove the greater portion of the $CO_2$ in said gases. This is a conventional step used in various industries and need not be described in detail here. The $CO_2$ free gases rich in hydrogen are then passed via line 28 to reducer 8.

It is within the spirit of the invention to vary the degree of conversion of the CO and $H_2O$ to $H_2$ and $CO_2$ in the CO converter. In fact, with some ores and under some sets of operating conditions in the range specified the CO converter 23 may be eliminated so that the gas in line 28 led to reducer 8 may be relatively rich in CO, up to 55%. Also, the degree of elimination of $CO_2$ in $CO_2$ scrubber 27 can be varied even to the degree of not using this apparatus, the $CO_2$ formed in the process being eliminated in the tail gases in line 13.

As to operating conditions, the following give good results:

Reducer 1

| | |
|---|---|
| Temperature °F | 1600 to 1800 |
| Pressure Lbs. per sq. in. gauge | 50–100 |
| Residence time of iron ore in reducer minutes | 15 to 30 |
| Superficial gas velocity Ft. per second (preferred) | 1.5 |
| Particle size of iron ore mesh | 10 to 100 |
| Feed rate of iron ore Lbs. per cubic ft. gas per hr | 0.4 to 0.8 |
| Percentage of $Fe_2O_3$ converted to FeO per cent | 85 to 100 |

Reducer 8

| | |
|---|---|
| Temperature °F | 1100 to 1300 |
| Pressure Lbs. per sq. in. gauge | 50 to 100 |
| Residence time of iron ore in reducer minutes | 20 to 40 |
| Superficial gas velocity Ft. per second (preferred) | 1.2 |
| Particle size of iron ore mesh | 10 to 100 |
| Feed rate of iron ore Lbs. per cubic ft. gas per hr | .1 to .3 |
| Percentage of FeO converted to Fe per cent | 97 to 100 |

Reformer 20

| | |
|---|---|
| Temperature °F | 1600 |
| Pressure (gauge) Lbs. per sq. in. (preferred) | 20 |
| Superficial gas velocity Ft. per second (preferred) | 1.5 |
| Particle size of catalyst mesh | 40 to 100 |

It should be pointed out that with respect to reformer 20, the same may be operated without a catalyst. As hereinbefore stated, if a catalyst is employed, the same should have a size of 40 to 100 microns in order to provide good fluidization and escape of catalyst from the said reformer.

The use of reformer 20 is not a restrictive portion of the invention. The reducer 8 may be operated on hydrogen gas produced from any other source. The essence of the invention is initial treatment of the iron ore first with methane to an atomic ratio of Fe to 0 of not less than 0.9 with subsequent reduction with essentially pure hydrogen.

As used herein, the term "oxidic ore" refers to the various oxides of iron and the reducible oxygen compounds thereof such as the carbonate and hydroxide, but specifically excludes other compounds of iron such as the sulfate, the chloride, etc.

Numerous modifications of my invention may be made by those familiar with this art without departing from the spirit thereof.

What I claim is:

1. The method of reducing oxidic iron ore which comprises subjecting the said ore in the form of a dense, fluidized bed of powdered ore to the influence of a normally gaseous hydrocarbon at elevated temperatures in a first reduction zone, withdrawing the partially reduced ore from the reduction zone and discharging it into a second reduction zone, treating the said ore in the second reduction zone while in the form of a dense, fluidized bed with a gas predominantly hydrogen at elevated temperatures, permitting the ore to remain resident in the second reduction zone for a period of time sufficient substantially to complete the reduction of said ore and recovering from said second reduction zone a product comprising the original ore in metallic state.

2. The method of reducing oxidic iron ore which comprises subjecting the said ore in the form of a dense, fluidized bed of powdered ore to the influence of a gas predominantly methane at elevated temperatures in a first reduction zone, withdrawing the partially reduced ore from the reduction zone and discharging it into a second reduction zone, treating the said ore in the second reduction zone while in the form of a dense, fluidized bed with a gas predominantly hydrogen at elevated temperatures, permitting the ore to remain resident in the second reduction zone for a period of time sufficient substantially to complete the reduction of said ore and recovering from said second reduction zone a product comprising the original ore in metallic state.

CHARLES E. HEMMINGER.

REFERENCES CITED

The following references are of record in the file of this patent:

UNITED STATES PATENTS

| Number | Name | Date |
|---|---|---|
| Re. 19,770 | Brown | Dec. 3, 1935 |
| 1,984,380 | Odell | Dec. 18, 1934 |
| 2,048,112 | Gahl | July 21, 1936 |
| 2,243,110 | Madaras | May 27, 1941 |
| 2,371,619 | Hartley | Mar. 20, 1945 |
| 2,399,984 | Caldwell | May 7, 1946 |
| 2,417,949 | Riveroll | Mar. 25, 1947 |

OTHER REFERENCES

Bureau of Mines Report on Sponge-Iron Experiments at Longview, Texas. R. I. 3925, August, 1946, pp. 5, 6, 7, 52 and Figure 25.